United States Patent [19]

Kashiwada et al.

[11] Patent Number: 5,087,345

[45] Date of Patent: Feb. 11, 1992

[54] CATION EXCHANGE MEMBRANE HAVING HIGH STABILITY

[75] Inventors: Akio Kashiwada; Tatsuo Hiyoshi, both of Yokohama, Japan

[73] Assignee: Asahi Kasei Kogyo Kabushiki Kaisha, Osaka, Japan

[21] Appl. No.: 552,890

[22] Filed: Jul. 16, 1990

[30] Foreign Application Priority Data

Jul. 17, 1989 [JP] Japan .................. 1-182562

[51] Int. Cl.$^5$ .................. C25B 13/08
[52] U.S. Cl. .................. 204/295; 204/296
[58] Field of Search .................. 204/295, 296; 521/27; 428/308.4, 311.1, 35.9, 316.6

[56] References Cited

U.S. PATENT DOCUMENTS 4,552,631 11/1985 Bissot et al. .................. 204/296
4,913,817 4/1990 Tsushima et al. .................. 204/296

FOREIGN PATENT DOCUMENTS 0066127 12/1982 European Pat. Off. .................. 204/296
0305155 3/1989 European Pat. Off. .................. 521/27
2064586 11/1980 United Kingdom .

Primary Examiner—John Niebling
Assistant Examiner—Kathryn Gorgos
Attorney, Agent, or Firm—Birch, Stewart, Kolasch & Birch

[57] ABSTRACT

A highly stable cation exhange membrane for use in the electrolysis of an alkali metal chloride is disclosed, which comprises a reinforced base membrane comprised of at least one layer of a fluorocarbon polymer and a reinforcing woven fabric encapsulated therein and a coating disposed on at least one surface of the reinforced base membrane, the coating comprising particles of at least one inorganic material selected from the group consisting of oxides, nitrides and carbides of elements belonging to group IV of the periodic table, which particles have an average primary particle diameter as small as from 0.01 to 0.2 μm, and a binder polymer. In the cation exchange membrane, the coating containing particles of an inorganic material, uniformly and strongly adheres to the surface of the reinforced base membrane, so that the inorganic material can remain in the coating for a prolonged period of time. Accordingly, by the use of the cation exchange membrane, the electrolysis of an alkali metal chloride can be stably performed at an advantageously low cell voltage for a prolonged period of time.

13 Claims, 1 Drawing Sheet

CATION EXCHANGE MEMBRANE HAVING HIGH STABILITY

BACKGROUND OF THE INVENTION

Field Of The Invention

The present invention relates to a cation exchange membrane having high stability. More particularly, the present invention is concerned with a highly stable cation exchange membrane for use in the electrolysis of an alkali metal chloride, which comprises a reinforced base membrane comprised of at least one layer of a fluorocarbon polymer and a reinforcing woven fabric encapsulated therein and a coating disposed on at least one surface of the reinforced base membrane, wherein the coating comprises particles of a specific inorganic material having an average primary particle diameter as small as from 0.01 to 0.2 $\mu$m and a binder polymer.

In the cation exchange membrane of the present invention, the coating containing particles of an inorganic material, uniformly and strongly adheres to the surface of the reinforced base membrane, so that the inorganic material remains in the coating for a prolonged period of time. Accordingly, by the use of the cation exchange membrane of the present invention, the electrolysis of an alkali metal chloride can be stably performed at an advantageously low cell voltage for a prolonged period of time.

DISCUSSION OF RELATED ART

The process for electrolyzing an alkali metal chloride into an alkali metal hydroxide and chlorine using an ion exchange membrane of a fluorocarbon polymer is now widely used, because a high quality alkali metal hydroxide can be produced with low energy without the occurrence of environmental pollution.

In the above-mentioned process for electrolyzing an alkali metal chloride, it is known that gases, i.e., chlorine gas and hydrogen gas, generated by electrolysis are adsorbed onto the surface of the ion exchange membrane, thereby causing the cell voltage to be increased. The increased cell voltage disadvantageously leads to an increase of energy consumption. Especially when the electrolysis is performed using the so-called narrow to zero gap cell, i.e., a cell having an anode and a cathode disposed therein at a spacing of about 1.5 mm or less therebetween or when the concentration of an alkali metal hydroxide is high in the electrolytic cell, the influence of generated gases is extremely large.

Heretofore, various methods have been proposed for preventing gases generated by electrolysis from being adsorbed onto the surface of the cation exchange membrane. In particular, a method wherein use is made of a cation exchange membrane having, disposed on the surface thereof, a coating comprised of an inorganic particle component and a binder component (this coating is hereinafter often referred to as "inorganic particle coating"), is excellent with respect to the prevention of the adsorption of generated gases, and has been employed in the art.

The inorganic particle coating disposed on the surface of a cation exchange membrane has excellent effects on the electrolytic performance of the cation exchange membrane through the prevention of gas adsorption. To ensure the desired performance of the cation exchange membrane, it is requisite that the inorganic particle coating uniformly and strongly adhere to the surface of the membrane.

In an effort to bond the inorganic particle coating uniformly and strongly to the surface of a cation exchange membrane of a fluorocarbon polymer, various proposals have been made. For example, a method has been proposed in which a mixture of inorganic material particles and a binder in liquid form is applied by spraying onto the surface of a cation exchange membrane placed on a hot plate, followed by heating under pressure. In another method, an inorganic particle layer is formed on a substrate by spraying and heating, and the layer is then transferred from the substrate onto the surface of a cation exchange membrane of a fluorocarbon polymer by heat-pressing.

The cation exchange membrane employed in the above-mentioned proposals is composed only of a fluorocarbon polymer and does not contain a reinforcing woven fabric. However, the cation exchange membrane of a fluorocarbon polymer now generally used on a commercial scale in the art has, encapsulated therein, a reinforcing woven fabric of a perfluoropolymer fiber for the purpose of imparting desired mechanical strength. Hence, such a reinforced cation exchange membrane has rough surfaces ascribed to the shape of the surfaces of the reinforcing woven fabric. Therefore, when the inorganic particle coating is formed on the surface of such a reinforced membrane by heat-pressing according to the conventional method, it is difficult to apply a pressure uniformly to the surfaces of the reinforced membrane due to the roughness of the surfaces thereof so that the adhesion strength of the inorganic particle coating to the surfaces of the membrane is poor.

A method for disposing an inorganic particle coating on a reinforced membrane having a reinforcing woven fabric incorporated therein and hence having rough surfaces is disclosed in U.S. Pat. No. 4,552,631, in which an inorganic particle coating comprising inorganic material particles and a fluorocarbon polymer is formed on the surface of a reinforced membrane simply by spraying and drying, without the necessity of subjecting the membrane to heat-pressing after the application of an inorganic particle coating onto the surface of the membrane. With respect to the inorganic material component to be employed, this U.S. patent refers to UK Patent Application GB 2064586 A, in which the use of inorganic material particles having a particle diameter of from 0.01 to 300 $\mu$m, particularly from 0.1 to 100 $\mu$m, is described. Actually, however, in the Examples of this U.S. patent, zirconium oxide particles having a particle diameter of from 1 to 4 $\mu$m and nickel oxide particles having a particle diameter of from 5 to 9 $\mu$m are used as inorganic material particles.

The coated cation exchange membrane disclosed in U.S. Pat. No. 4,552,631, however, still has drawbacks. That is, the adhesion strength of the inorganic particle coating to the surface of the membrane is still not satisfactory and the inorganic particle coating is likely to come off during the electrolysis operated for a prolonged period of time. As mentioned above, the particle diameter of the inorganic material particles which are actually used in the U.S. patent is large. With such a large particle diameter as used in the U.S. patent, the inorganic particle coating with a sufficient adhesion strength cannot be formed on the surface of a precursor membrane (a melt-fabricable membrane having functional groups convertible to ion exchange groups by hydrolysis) by a spraying method since the precursor membrane surface containing large diameter particles has water repellence properties inherent therein. Therefore, for obtaining a strongly adhered inorganic particle coating containing such large particles, the precursor membrane must be hydrolyzed and dried before a mixture of inorganic material particles and a binder is applied by spraying. This intermediate drying process is troublesome when the membrane is produced on a commercial scale.

Therefore, there has been a strong demand in the art for a cation exchange membrane comprising a membrane of a perfluorocarbon polymer reinforced with a woven fabric of perfluorocarbon polymer strands and a coating of an inorganic material uniformly and strongly adhering to the woven fabric-reinforced membrane.

SUMMARY OF THE INVENTION

With a view toward developing a cation exchange membrane comprising a base membrane of a perfluorocarbon polymer having sulfonate groups and/or carboxylate groups reinforced with a woven fabric of perfluorocarbon polymer strands and a coating of an inorganic material uniformly and strongly adhering to the base membrane, the present inventors have made extensive and intensive studies. As a result, it has unexpectedly been found that a desired cation exchange membrane having a coating of an inorganic material uniformly and strongly adhering to a base membrane, which exhibits advantageously low cell voltage and high current efficiency, can be obtained by the use of particles of at least one inorganic material selected from the group consisting of oxides, nitrides and carbides of elements belonging to group IV of the periodic table, which particles have an average primary particle diameter of from 0.01 to 0.2 $\mu$m. The present invention is based on this unexpected finding.

Accordingly, it is an object of the present invention to provide a cation exchange membrane having a coating of inorganic material particles uniformly and strongly adhering to a base membrane, which coating can retain the inorganic material particles for a prolonged period of time.

The foregoing and other objects, features and advantages of the present invention will be apparent form the following detailed description and appended claims taken in connection with the accompanying drawings.

DETAILED DESCRIPTION OF THE INVENTION

Essentially, according to the present invention, there is provided a cation exchange membrane comprising:

a reinforced base membrane comprising at least one layer of a fluorocarbon polymer having pendant sulfonate groups, carboxylate groups or a mixture thereof and, encapsulated therein, a reinforcing fabric comprising warp and weft strands of a perfluorocarbon polymer, the warp and weft strands crossing each other to form window portions defined by the crossed warp and weft strands, and a coating disposed on at least one surface of the reinforced base membrane in an amount of from 0.01 to 10 mg/cm$^2$ of the membrane surface, the coating comprising 30 to 95% by weight, based on the total weight of the coating, of particles of at least one inorganic material selected from the group consisting of oxides, nitrides and carbides of elements belonging to group IV of the periodic table, the organic material particles having an average primary particle diameter of from 0.01 to 0.2 $\mu$m, and 5 to 70% by weight, based on the total weight of the coating, of a binder comprised of a hydrophilic fluorocarbon polymer.

The inorganic material to be used in the present invention for forming a coating together with a hydrophilic fluorocarbon polymer should be anticorrosive to electrolytes and hydrophilic, and is selected from the group consisting of oxides, nitrides and carbides of elements belonging to group IV of the periodic table. Preferred examples of such elements are zirconium, silicon and titanium. The most suitable inorganic material is zirconium oxide.

The inorganic material is in the form of particles, which has an average primary particle diameter of from 0.01 to 0.2 $\mu$m, preferably from 0.02 to 0.08 $\mu$m.

The terminology "primary particle" used herein means a particle which can be visually recognized as a minimum unit particle by means of an electron microscope. With respect to "the primary particle", reference can be made to, for example, page 98 of "*Funtai no Hyomen Kaishitsu Gijutsu Shiryoshu* (Technical Data Collection on Surface Modification of Particulate Materials) published by the Publishing Division of Soft Giken, Japan. The primary particles can clearly be discriminated from agglomerated particles and polymers on an electron photomicrograph (magnification: about 100,000). The average primary particle diameter can be obtained based on the diameters of the primary particles, which are measured by an electron microscope. For obtaining an average primary particle diameter, 200 to 500 particles are usually measured in accordance with the ordinarily employed method for measuring particle diameter (reference may be made to, for example, "*Funtai Kogaku Binran* (Powder Engineering Handbook) edited by *Funtai Kogakkai* (Japanese Society of Powder Engineering) and published by Nikkan Kogyo Shimbun Sha, Japan, pages 1 to 50, 1986).

Figure 2:
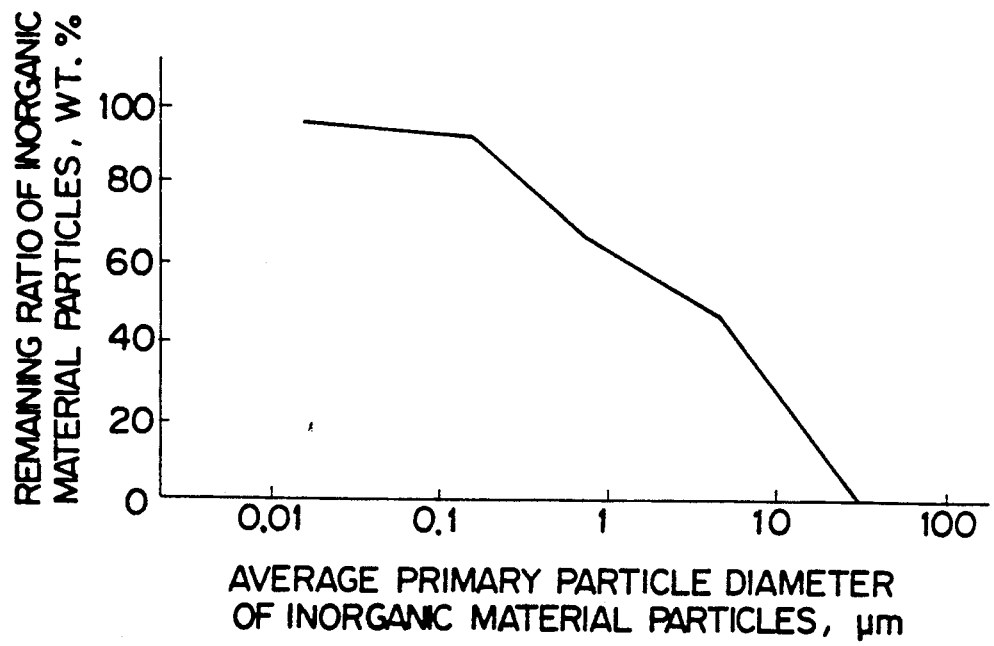
FIG. 2 is a graph showing the relationship between the average primary particle diameter of the inorganic material contained in a coating and the remaining ratio of inorganic material particles in the coating after the electrolytic operation for a period of 8 months.

The relationship between the average primary particle diameter of the inorganic material particles contained in a coating and the remaining ratio of the inorganic material particles in the coating after the electrolytic operation for a period of 8 months is shown in FIG. 2. The terminology "remaining ratio" used herein is defined as a weight percentage of the amount of the inorganic material particles remaining in the coating after the electrolytic operation to the amount of the inorganic material particles having been present in the coating before the electrolytic operation. The remaining ratio ($\alpha$, %) is determined as follows. The amount ($\beta_1$, in terms of fluorescent X-ray intensity) of the element belonging to group IV of the periodic table (hereinafter referred to simply as "group IV element") contained in the inorganic material particles present in the coating of a sample cation exchange membrane, is measured by means of an X-ray microanalyzer (see "Manual for Fluorescent X-ray Analysis (page 45) published by Rigaku Denki Kogyo K.K., Japan, in 1982). The sample cation exchange membrane is incorporated in an electrolytic cell and electrolysis of an alkali metal chloride is performed for a predetermined period of time. After completion of the electrolytic operation, the amount ($\mu_2$, in terms of fluorescent X-ray intensity) of the group IV element contained in the inorganic material particles remaining in the coating irrespective of the electrolytic operation is measured by means of an X-ray microanalyzer. The remaining ratio ($\alpha$, %) is calculated according to the formula:

$$\alpha = \frac{\beta_2}{\beta_1} \times 100.$$

As shown in FIG. 2, the remaining ratio of the inorganic material particles in the coating is excellent when the average primary particle diameter of inorganic material particles is 0.2 $\mu$m or less. With respect to the lower limit of the average primary particle diameter, it is to be noted that the production of inorganic material particles having an average primary particle diameter of less than 0.01 $\mu$m is extremely difficult.

The reason why the above-mentioned remaining ratio is increased when the average primary particle diameter of inorganic material particles is 0.2 $\mu$m or less has not yet been elucidated. However, it is presumed that when the average primary particle diameter is as small as 0.2 $\mu$m or less, the compatibility of the particles with the binder comprised of a hydrophilic fluorocarbon polymer is improved due to an increase in the surface area and in the surface energy of the particles, thereby rendering the remaining ratio improved.

The inventors of the present invention have also found that there is a relationship between the average primary particle diameter and the uniformity of the amount of the coating over the surface of the cation exchange membrane. When the average primary particle diameter is in the range of from 0.01 to 0.2 $\mu$m, the uniformity of the amount of the coating over the surface of the cation exchange membrane is excellent.

In the present invention, the amount of the coating per cm$^2$ of the membrane surface is in the range of from 0.01 to 10 mg/cm$^2$, preferably from 0.05 to 3 mg/cm$^2$. When the amount is smaller than 0.01 mg/cm$^2$, the gas adhesion-preventive effect is insufficient. On the other hand, when the amount is larger than 10 mg/cm$^2$, the electrolytic voltage is unfavorably high in an electrolytic cell.

In the present invention, the amount of the coating per cm$^2$ of the membrane surface ($W_c$, mg/cm$^2$) is determined as follows. From a cation exchange membrane to be analyzed, a sample having a predetermined surface area (S, cm$^2$), for example about 10 cm $\times$ 10 cm, is taken and the weight thereof ($W_1$, mg) in the dry state is measured. The coating is removed from the reinforced base membrane of the sample, e.g., by immersing the sample in a 50:50 mixture of water and methanol and brushing. The resultant reinforced base membrane is dried, and the weight ($W_2$, mg) thereof in measured. $W_c$ is calculated by the formula:

$$W_c = \frac{W_1 - W_2}{S}.$$

The uniformity of the amount of the coating is evaluated in terms of the coefficient of variation ($C_v$, %) calculated by the following formula:

$$C_v = \frac{S_d}{\bar{\beta}} \times 100 \, (\%)$$

wherein $S_d$ represents a standard deviation of the amounts of the group IV element contained in the coating, as measured at 20 portions per dm$^2$ of the membrane surface, which portions are arbitrarily taken in a region of the membrane which portion corresponds to an effective current flowing area, by means of an X-ray microanalyzer (see the reference mentioned above), and $\bar{\beta}$ represents an arithmetic average of the above-mentioned amounts of the group IV element.

When the average primary particle diameter of the inorganic material particles contained in the coating is in the range of from 0.01 to 0.2 $\mu$m, the coefficient of variation is advantageously as small as 6% or less. On the other hand, when the average primary particle diameter is larger than 0.2 $\mu$m, the coefficient of variation is disadvantageously large.

The amount of an inorganic material in the coating is in the range of from 30 to 95 wt %, preferably 70 to 90 wt %, based on the weight of the coating. When the amount of an inorganic material in the coating is smaller than 30 wt %, sufficient gas absorption-preventive effect cannot be attained. On the other hand, when the amount of the inorganic material is larger than 95 wt %, the mechanical strength of the coating is poor.

In the present invention, a hydrophilic fluorocarbon polymer (homopolymer or copolymer) is used as the binder for bonding the inorganic material to the reinforced base membrane. Especially preferred is a fluorocarbon copolymer having sulfonic acid or sulfonate groups. Preferred examples of such fluorocarbon copolymers include a copolymer having an equivalent weight of from 800 to 1300 as obtained by copolymerizing a monomer selected from the first group of monomers of the formula:

$$CF_2=CX_1X_2 \qquad (I)$$

wherein each of $X_1$ and $X_2$ independently represents a fluorine atom, a chlorine atom, a hydrogen atom or a trifluoromethyl group;

with a monomer selected from the second group of monomers of the formula:

$$CF_2=CFO(CF_2CFO)_n(CF_2)_mSO_3X \qquad (II)$$
$$\phantom{CF_2=CFO(CF_2}|$$
$$\phantom{CF_2=CFO(CF_2CF}X_3$$

wherein X represents a hydrogen atom, Na or K, $X_3$ represents a fluorine atom or a trifluoromethyl group, n is as integer of from 0 to 2, and m is an integer of from 1 to 3.

The reinforced base membrane for use in the cation exchange membrane of the present invention comprises at least one layer of a fluorocarbon polymer having pendant sulfonate groups, carboxylate groups or a mixture thereof as cation exchange groups. The cation exchange groups-containing fluorocarbon polymer is obtained by hydrolyzing a melt-fabricable fluorocarbon polymer comprising a main chain of a fluorocarbon and having functional groups convertible to cation exchange groups (hereinafter, the melt-fabricable fluorocarbon polymer being referred to as "precursor fluorocarbon polymer").

The method for producing the precursor fluorocarbon polymer is not specifically limited, and with respect to the method, reference may be made to, for example, U.S. Pat. Nos. 4,536,352, 4,131,740 and 3,282,875.

The precursor fluorocarbon polymer having functional groups convertible to carboxylate groups can be produced by copolymerizing at least one monomer selected from the first group of monomers of formula (I) described above with at least one monomer selected from the following third groups of monomers of formula (III):

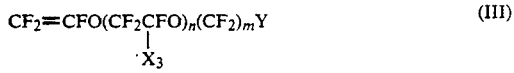

wherein $X_3$, n and m are as defined above and Y is a precursor group which can be converted by hydrolysis to a carboxylate group in the presence of an alkali medium.

The above-mentioned precursor group which can be converted to a carboxylate group is selected from the group consisting of a carboxylic ester group represented by the formula —COOR wherein R represents a lower alkyl group having 1 to 4 carbon atoms, a cyano group represented by the formula —CN and an acid halide group represented by the formula —COG wherein G represents a halogen atom. Of these, the carboxylic ester group can preferably be used. An especially preferred monomer of the third group is be represented by the formula:

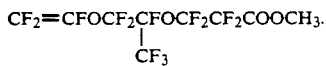

The precursor fluorocarbon polymer having functional groups convertible to sulfonate groups can be produced by copolymerizing at least one monomer selected from the first group of monomers of formula (I) described above with at least one monomer selected from the following fourth group of monomers of formula (IV):

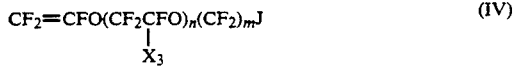

wherein $X_3$ is as defined above and J is a precursor group which can be converted by hydrolysis to a sulfonate group.

The above-mentioned precursor group which can be converted to a sulfonate group is selected from the group consisting of a sulfonyl halide group represented by the formula —SO$_2$X$_4$ wherein X$_4$ represents a fluorine atom, a chlorine atom or a bromine atom, and an alkylsulfone group represented by the formula —SO$_2$R wherein R represents a lower alkyl group having 1 to 4 carbon atoms. Preferred monomers of the fourth group may be represented by the formula:

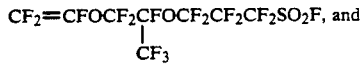

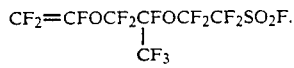

In the present invention, it is preferred that the reinforced base membrane comprise two layers of a fluorocarbon polymer, and that one layer (hereinafter referred to as "layer A") comprise a perfluorocarbon polymer containing carboxylate groups and be disposed on the cathode side in an electrolytic cell while the other layer (hereinafter referred to as "layer B") comprise a perfluorocarbon polymer containing sulfonate groups and be disposed on the anode side in the electrolytic cell.

The equivalent weight of layer A is preferably in the range of from 1,000 to 1,600, depending on the concentration of sodium hydroxide employed in an electrolytic cell. The equivalent weight of layer A can be regulated by regulating the proportion of monomer (I) to monomer (III). On the other hand, the equivalent weight of layer B is preferably in the range of from 700 to 1,300, more preferably in the range of from 900 to 1,200. The desired equivalent weight of layer B can be obtained by regulating the proportion of monomer (I) to monomer (IV).

The cation exchange membrane of the present invention may further comprise between layer A and layer B at least one layer of a fluorocarbon copolymer having an equivalent weight different from those of layers A and B.

The cation exchange membrane of the present invention has a reinforcing fabric encapsulated therein which comprises warp and weft strands of a perfluorocarbon polymer. With respect to the reinforcing fabric, reference may be made to, for example, U.S. Pat. Nos. 4,072,793 and 4,437,951. The reinforcing fabric is encapsulated in the membrane for the purpose of improving the mechanical strength, the dimensional stability and the electrolytic performance stability of the membrane. When the reinforced base membrane comprises two or more layers, the reinforcing fabric may be encapsulated in one of the layers. Alternatively, the reinforcing fabric may be encapsulated in two of the layers, bridging them. Generally, however, from the viewpoint of the electrochemical performance of the cation exchange membrane, i.e., for obtaining a low electrolytic voltage, it is preferred that the reinforcing fabric be encapsulated in one layer having sulfonate groups which is to be disposed on the side of the anode in an electrolytic cell.

The reinforcing fabric to be used in the present invention comprises warp and weft strands each preferably comprising a monofilament or a multifilament of a fluorocarbon polymer, such as a tetrafluoroethylene homopolymer and a copolymer of tetrafluoroethylene with hexafluoropropylene or a perfluorovinyl ether. The monofilament and the multifilament each have a size of from 30 to 400 denier, preferably from 50 to 200 denier. The reinforcing fabric may assume various forms. Generally, however, from the viewpoint of decreasing a current shielding which is attributed to the ion impermeability inherent in the reinforcing fabric, it is preferred that the texture of the fabric be coarse and the openness, as defined below, of the fabric be large. Preferred examples of reinforcing fabrics include a plain woven fabric and a leno woven fabric.

The term "openness" used herein means a ratio, as expressed in terms of a percentage, of the total area of the window portions defined by the crossed warp and weft strands of the reinforcing fabric to the overall area of the fabric. The above-mentioned total area of the window portions and the overall area of the fabric are readily measured on a photograph showing a plan view of the fabric.

The openness of the reinforcing fabric is preferably in the range of from 50 to 95%, more preferably in the range of from 60 to 90%. When the openness is larger than 95%, sufficient reinforcing effect cannot be obtained. On the other hand, when the openness is smaller than 50%, the current shielding is disadvantageously increased so that the cell voltage is disadvantageously increased.

If desired, the woven reinforcing fabric may further comprise sacrificial strands, such as those of a rayon and a polyester which are soluble in an alkali solution. When the woven reinforcing fabric is comprised of reinforcing strands and sacrificial strands, the portions formed by removal of the sacrificial strands contribute to the openness of the reinforcing fabric.

The thickness of the reinforcing fabric affects the easiness of the encapsulation of the reinforcing fabric in the fluorocarbon polymer layer or layers. Generally, the thickness of the reinforcing fabric is 150 μm or less, preferably 100 μm or less. The thickness of the reinforcing fabric may be controlled by the conventional calendering method.

When the reinforced base membrane comprises layers A and B as mentioned above, the thickness of layer A having carboxylate groups is generally in the range of from 1 to 80 μm, preferably from 5 to 50 μm, more preferably from 5 to 30 μm. When the thickness of layer A is larger than 80 μm, the electric resistance is likely to become disadvantageously high in an electrolytic cell. On the other hand, when the thickness of layer A is smaller than 1 μm, the electric resistance can be decreased, but the structure of the layer is likely to be undesirably non-uniform. With respect to the thickness of layer B having sulfonate groups, it is preferred that layer B have a sufficient thickness so as to encapsulate the reinforcing fabric therein. From the viewpoints of the satisfactory encapsulation of the reinforcing fabric in the layer and the mechanical strength, particularly the practical handling strength, of the layer, it is preferred that the thickness of layer B be at least 25 μm, especially at least 50 μm. It is preferred that the upper limit of the thickness be 200 μm. When the thickness is larger than 200 μm, unfavorably high electrolytic voltage is caused in an electrolytic cell.

The precursor fluorocarbon polymer having functional groups convertible to sulfonate groups, carboxylate groups or a mixture thereof is melt fabricable, and can be molded into a membrane (hereinafter referred to as "precursor membrane") by conventional methods, for example, by press molding using a heat press, shaping by means of rolls, extrusion molding, coextrusion molding, or the like. Of these, an extrusion molding is generally used on a commercial scale. In the present invention, when a precursor reinforced base membrane comprising two or more layers of fluorocarbon polymers is produced, a coextrusion molding is preferably used. The method for encapsulating the reinforcing fabric in the precursor fluorocarbon polymer layer or layers is not specifically limited, and with respect to the method for the encapsulation, reference may be made to, for example, U.S. Pat. No. 4,324,606. For example, the reinforcing fabric may be encapsulated by sandwiching the reinforcing fabric between two layers of precursor fluorocarbon polymers and heating the resultant layers while degassing to thereby obtain a desired precursor reinforced membrane.

In the present invention, the coating is formed on the precursor reinforced base membrane by applying a coating liquid, as obtained by dispersing inorganic material particles having an average primary particle diameter of 0.01 to 0.2 μm in a fluorocarbon polymer solution, onto at least one surface of a precursor reinforced base membrane comprising a precursor fluorocarbon polymer having precursor ion exchange groups which can be converted to carboxylate groups, sulfonate groups or a mixture thereof by hydrolysis.

The precursor reinforced base membrane has a critical surface tension as small as 20 dyn/cm while the above-mentioned coating liquid generally has a surface tension of 30 dyn/cm or more. This means that the precursor reinforced base membrane is highly repellent to the coating liquid. Thus, when it is attempted to form the coating on the precursor reinforced base membrane by means of a roll coater or the like, the coating liquid would be repelled so that any coating cannot be formed or the resultant coating would be extremely non-uniform in thickness. Therefore, it is infeasible to obtain a uniform coating having a satisfactory adhesion to the precursor reinforced base membrane.

However, the present inventors have found that a successful formation of the coating on the surface of a highly repellent precursor reinforced base membrane can be attained by a specific spray method as described in detail below.

The specific method for forming the coating on the surface of such a precursor reinforced base membrane, which coating has a uniform thickness and an excellent adhesion to the membrane, will be described below. An amount of 1 to 20% by weight, preferably 1 to 5% by weight of a fluorocarbon polymer, is dissolved in an aqueous solution containing 20% by weight or more, preferably 30% by weight or more of an alcoholic solvent while heating. Then, 1 to 50% by weight, preferably 1 to 30% by weight of inorganic material particles are added to the resultant solution and uniformly dispersed therein, thereby obtaining a coating liquid. The inorganic material particles can be prepared by a conventional means, such as a ball mill.

Representative examples of alcoholic solvents include methanol, ethanol, n-propanol, isopropanol, n-butanol and 2-butanol.

The inorganic material particles are agglomerated in the coating liquid. The average size of agglomerated inorganic material particles in the coating liquid is generally in the range of from 0.2 to 3.0 μm, preferably in the range of from 0.3 to 2.0 μm as measured using a particle size distribution-measuring centrifugal apparatus (Type CP-2, manufactured and sold by Shimadzu Corporation, Japan). When the above-mentioned average size of the agglomerated inorganic material particles in the coating liquid is in the above-mentioned range, neither cracking of the coating nor coming-off of the coating from the precursor reinforced base membrane occurs during the subsequent hydrolysis step. Further, the mechanical strength of the coating in the dry state is high.

When the alcoholic solvent concentration of the aqueous alcoholic solvent solution is less than 20% by weight and when the amount of the fluorocarbon polymer added to the aqueous alcoholic solvent solution is larger than 20% by weight, based on the total weight of the fluorocarbon polymer and the solution, it is impossible to completely dissolve the fluorocarbon polymer in the aqueous solution.

When the amount of the inorganic material, based on the amount of the coating liquid, is larger than 50% by weight, it is infeasible to control the average size of agglomerated inorganic material particles in the coating liquid to 3.0 μm or less.

The application of the coating liquid to at least one surface of a precursor reinforced base membrane can be performed by spraying. That is, the coating liquid is sprayed in the form of fine coating liquid particles having an average particle diameter of 5 to 40 μm in an amount of less than 50 ml/m$^2$.min.

When the coating liquid particles having an average particle diameter of less than 5 μm are sprayed, the ratio of the amount of the liquid particles adhering to the membrane surface to that of the sprayed liquid particles is disadvantageously small. On the other hand, when the average particle diameter of the coating liquid particles is larger than 40 μm, a coating which is uniform in the amount of the coating over the surface cannot be obtained.

When the coating liquid is sprayed in an amount of more than 50 ml/m$^2$.min, the sprayed liquid particles are likely to be coagulated on the surface of a precursor reinforced base membrane to thereby form a coating liquid layer which is repelled by the surface of the precursor reinforced base membrane.

In the present invention, the spraying may be conducted by a conventional method using air. Alternatively, a conventional airless spraying method can also advantageously be used. Further, to increase the ratio of the amount of the coating liquid adhering to the surface of a precursor reinforced base membrane to the amount of the sprayed coating liquid, an electrostatic airless spraying method can advantageously be used.

With respect to the precursor reinforced base membrane comprising layers A and B as mentioned above, the coating may be formed on only one outer surface or on both outer surfaces of the precursor reinforced base membrane. The coating is usually formed over the whole surface of the membrane. When the coating is disposed on one outer surface of the precursor reinforced base membrane, it is preferred that the coating be disposed on layer A, i.e., the fluorocarbon polymer layer having precursor groups convertible to carboxylate groups. Even when the coating is disposed on only one outer surface of the membrane, gas adhesion can advantageously be prevented in electrolysis so that the electrolytic voltage is advantageously not increased. However, it is generally preferred that the coating be also formed on the other surface of the precursor reinforced base membrane, because the increase of the electrolytic voltage can further be effectively prevented and the salting out of a alkali chloride within the membrane can be effectively prevented, leading to a prevention of damage of the membrane.

The precursor reinforced base membrane described above has pendant functional groups in a melt-fabricable form, which per se do not have an ion exchange capability. Therefore, prior to the use of the membrane for producing an alkali metal hydroxide, it is necessary that the precursor reinforced base membrane be hydrolyzed by conventional methods using an acid or alkali so that all of the precursor functional groups are converted to ion exchange carboxylate and/or sulfonate groups.

The thus obtained cation exchange membrane of the present invention is advantageously used in a narrow to zero gap cell, i.e., a cell having an anode and a cathode disposed at a spacing of about 1.5 mm or less therebetween. The electrolysis of an alkali metal chloride solution can be conducted under conditions such as conventionally employed. For example, an electrolysis can be conducted at a current density of 5 A/dm$^2$ to 80 A/dm$^2$ at 50 to 110 °C. using an alkali metal chloride solution having an alkali metal chloride concentration of 140 g/liter to 290 g/liter which is charged in an anode compartment.

In the cation exchange membrane of the present invention, the coating containing particles of an inorganic material uniformly and strongly adheres to the reinforced base membrane, so that the inorganic material can remain in the coating for a prolonged period of time. Accordingly, by the use of the cation exchange membrane of the present invention, the electrolysis of an alkali metal chloride can be stably performed at an advantageously low cell voltage for a prolonged period of time.

In the process disclosed in U.S. Pat. No. 4,552,631, as mentioned above, the inorganic particle coating with a sufficient adhesion strength cannot be formed on the surface of a precursor membrane by a spraying method since the precursor membrane surface containing large diameter particles has water repellence properties inherent therein, and therefore, for obtaining a strongly adhered inorganic particle coating containing such large particles, the precursor membrane must be hydrolyzed and dried before a mixture of inorganic material particles and a binder is applied by spraying. This intermediate drying process is troublesome when the membrane is produced on a commercial scale. By contrast, in the process employed in the present invention, as mentioned above, a mixture of inorganic material particles and a binder can advantageously be applied by spraying directly to the precursor membrane with attaining a sufficient adhesion strength, without necessity of the troublesome intermediate drying process as required in the process disclosed in U.S. Pat. No. 4,552,631.

Hereinbelow, the present invention will be described in more detail with reference to Examples and Comparative Examples, which should not be construed as limiting the scope of the present invention.

EXAMPLE 1

A copolymer of $CF_2=CF_2$ and $CF_2=CFO(CF_2)_3$, having an equivalent weight of 1,400, is subjected to extrusion molding, thereby obtaining a film having a thickness of 25μm (film A).

On the other hand, a copolymer of $CF_2=CF_2$ and $CF_2=CFOCF_2CF(CF_3)O(CF_2)_2SO_2F$, having an equivalent weight of 1,100, is subjected to extrusion molding, thereby obtaining a film having a thickness of 125 μm (film B). A 18-mesh plain woven fabric of polytetrafluoroethylene strands each having a size of 200 denier is sandwiched between the above-prepared film A and film B and pressed under heating, thereby obtaining a precursor reinforced base membrane.

An amount of 10% by weight of a copolymer of $CF_2=CF_2$ and $CF_2=CFOCF_2CFOCF_2CF_2CF_2SO_3H$, having an equivalent weight of 1000, is dissolved in a 50:50 by weight mixture of water and ethanol. Added to the resultant mixture is zirconium oxide having an average primary particle diameter of 0.02 μm in an amount of 40% by weight, based on the total amount of the zirconium oxide and the mixture. The zirconium oxide is uniformly dispersed in the mixture by a ball mill, to thereby obtain a suspension. The suspension is sprayed on both surfaces of the precursor reinforced base membrane and dried, thereby obtaining a precursor membrane having a coating.

The amount of the coating per cm² of the membrane surface is 0.52 mg/cm². The standard deviation of the amounts of the coating as defined above is as small as 0.03 mg/cm², and the coefficient of variation as defined above is as small as 5.8%. The coating is observed by an electron microscope, and it is found that the coating is uniform over the entire surface of the membrane and is free of cracks.

The resultant precursor reinforced membrane having the coating is subjected to hydrolysis in a solution containing 30% by weight of potassium hydroxide and 5% by weight of dimethylsulfoxide. The resultant membrane is subjected to equilibrating treatment with a 0.1N aqueous sodium hydroxide solution put in a beaker, and then heated at 90° C. for 2 hours, thereby obtaining a final cation exchange membrane. Coming-off of the coating is not observed by the equilibrating treatment.

The thus obtained cation exchange membrane is set in an electrolytic cell in a manner such that the outer surface of film A having carboxylate groups is disposed on the side of a low hydrogen overpotential cathode and the surface of film B having sulfonate groups is disposed on the side of a low chlorine overpotential anode. Then, electrolysis is conducted at 90° C. at a current density of 40A/dm² for 8 months while maintaining the concentration of sodium chloride in the anode compartment at 200 g/l.

Figure 1:
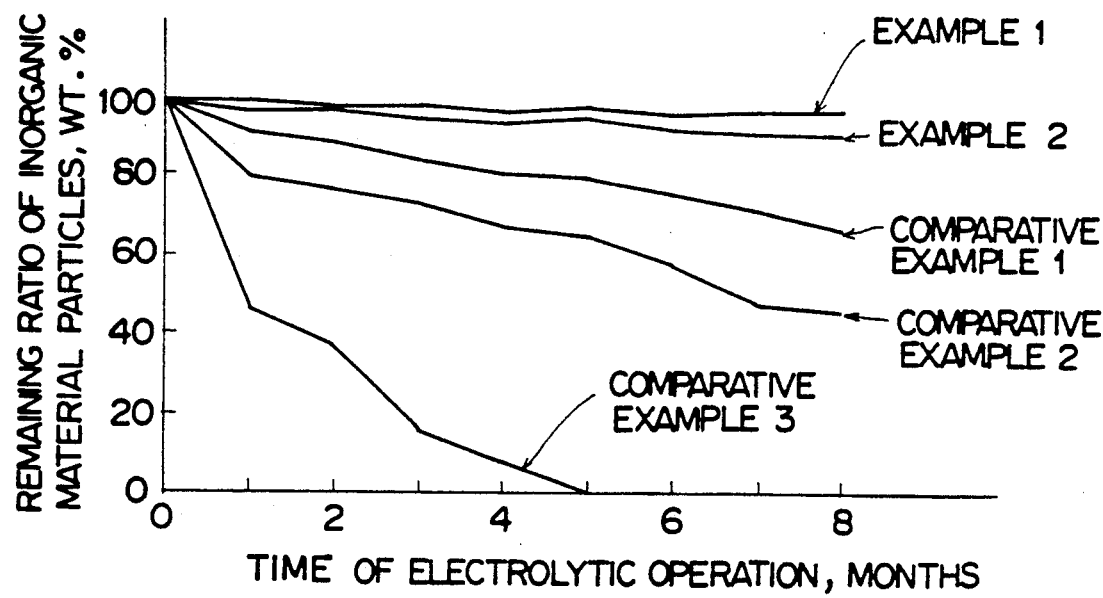
FIG. 1 is a graph showing the change of the remaining ratio, as defined later, of inorganic material particles in a coating with the lapse of time of electrolytic operation (months) with respect to each of the cation exchange membranes produced in Examples 1 and 2 and Comparative Examples 1, 2 and 3.

The remaining ratio of inorganic material particles in the coating is measured by an X-ray microanalyzer every month. The results are shown in FIG. 1. The remaining ratio after the electrolytic operation for 8 months is 97%.

EXAMPLE 2

Substantially the same procedure as in Example 1 is repeated except that zirconium oxide having an average primary particle diameter of 0.2 μm is used, to thereby obtain a cation exchange membrane.

The amount of the coating per cm² of the membrane surface is 0.55 mg/cm². The standard deviation of the amounts of the coating as defined above is as small as 0.03 mg/cm², and the coefficient of variation as defined above is as small as 5.5%. The remaining ratio of inorganic material particles is determined in the same manner as in Example 1. The results are shown in FIG. 1. The remaining ratio after the electrolytic operation for 8 months is 95%.

Comparative Examples 1, 2 and 3

Substantially the same procedure as in Example 1 is repeated except that zirconium oxides having average primary particle diameters of 0.7 μm, 5 μm, and 36 μm are, respectively, used in Comparative Examples 1, 2 and 3, to thereby obtain cation exchange membranes.

The amounts of the coating per cm² of the membrane surface in Comparative Examples 1, 2 and 3 are 0.51, 0.52 and 0.47 mg/cm², respectively. The standard deviations of the amounts of the coating are 0.11, 0.39 and 0.61 mg/cm², respectively, and the coefficients of variation are 21.6%, 75% and 129.8%, respectively. As apparent from the results, the coefficient of variation is increased with an increase of a particle size.

The remaining ratios of inorganic material particles are determined in the same manner as in Example 1. The results are shown in FIG. 1. The remaining ratios after the electrolytic operation for 8 months are 67%, 56%, and 0%, respectively.

What is claimed is:

1. A cation exchange membrane comprising:
    a reinforced base membrane comprising at least one layer of a fluorocarbon polymer having pendent sulfonate groups, carboxylate groups or a mixture thereof and, encapsulated therein, a reinforcing fabric comprising warp and weft strands of a perfluorocarbon polymer, said warp and weft strands crossing each other to form window portions defined by the crossed warp and weft strands, and
    a coating disposed on at least one surface of the reinforced base membrane in an amount of from 0.01 to 10 mg/cm² of the membrane surface, said coating comprising 30 to 95% by weight, based on the total weight of the coating, of particles of at least one inorganic material selected from the group consisting of oxides, nitrides and carbides of elements belonging to group IV of the periodic table, said inorganic material particles having an average primary particle diameter of from 0.01 to 0.02 μm, and 5 to 70% by weight, based on the total weight of the coating, of a binder comprised of a hydrophilic fluorocarbon polymer, said binder having said particles dispersed therein.

2. The membrane according to claim 1, wherein said warp and weft strands are each comprised of monofilament or a multifilament of a perfluorocarbon polymer having a size of from 30 to 400 denier, and said reinforcing fabric has an openness of from 50 to 95% in terms of a ratio of a total area of the window portions to an overall area of the fabric.

3. The membrane according to claim 1, wherein said elements belonging to group IV of the periodic table are zirconium, silicon and titanium.

4. The membrane according to claim 3, wherein said inorganic material is zirconium oxide.

5. The membrane according to claim 1, wherein said binder is comprised of a fluorocarbon polymer containing sulfonate groups and having an equivalent weight of from 800 to 1300.

6. The membrane according to claim 1, wherein said reinforced base membrane comprises two layers in which one layer thereof is comprised of a fluorocarbon polymer containing carboxylate groups and the other layer thereof is comprised of a fluorocarbon polymer containing sulfonate groups, and said coating is disposed on an outer surface of said one layer.

7. The membrane according to claim 6, wherein said coating is disposed on an outer surface of said other layer.

8. The membrane according to claim 1, which is used in an electrolytic cell having an anode and a cathode disposed at a spacing of about 1.5 mm or less therebetween.

9. The membrane according to claim 1, wherein the average primary particle diameter of said inorganic material particles is from 0.01 to 0.08 μm.

10. The membrane according to claim 1, wherein said coating comprises 70 to 95% by weight of said particles of at least one inorganic material.

11. The membrane according to claim 1, wherein the openness of said reinforcing fabric is from 60 to 90%.

12. The membrane according to claim 1, wherein the thickness of the reinforcing fabric is 150μ or less.

13. The membrane according to claim 1, wherein the thickness of the reinforcing fabric is 100μ or less.

* * * * *